(No Model.)
J. ATWILL, Jr.
LAMP BRACKET.
No. 581,503. Patented Apr. 27, 1897.
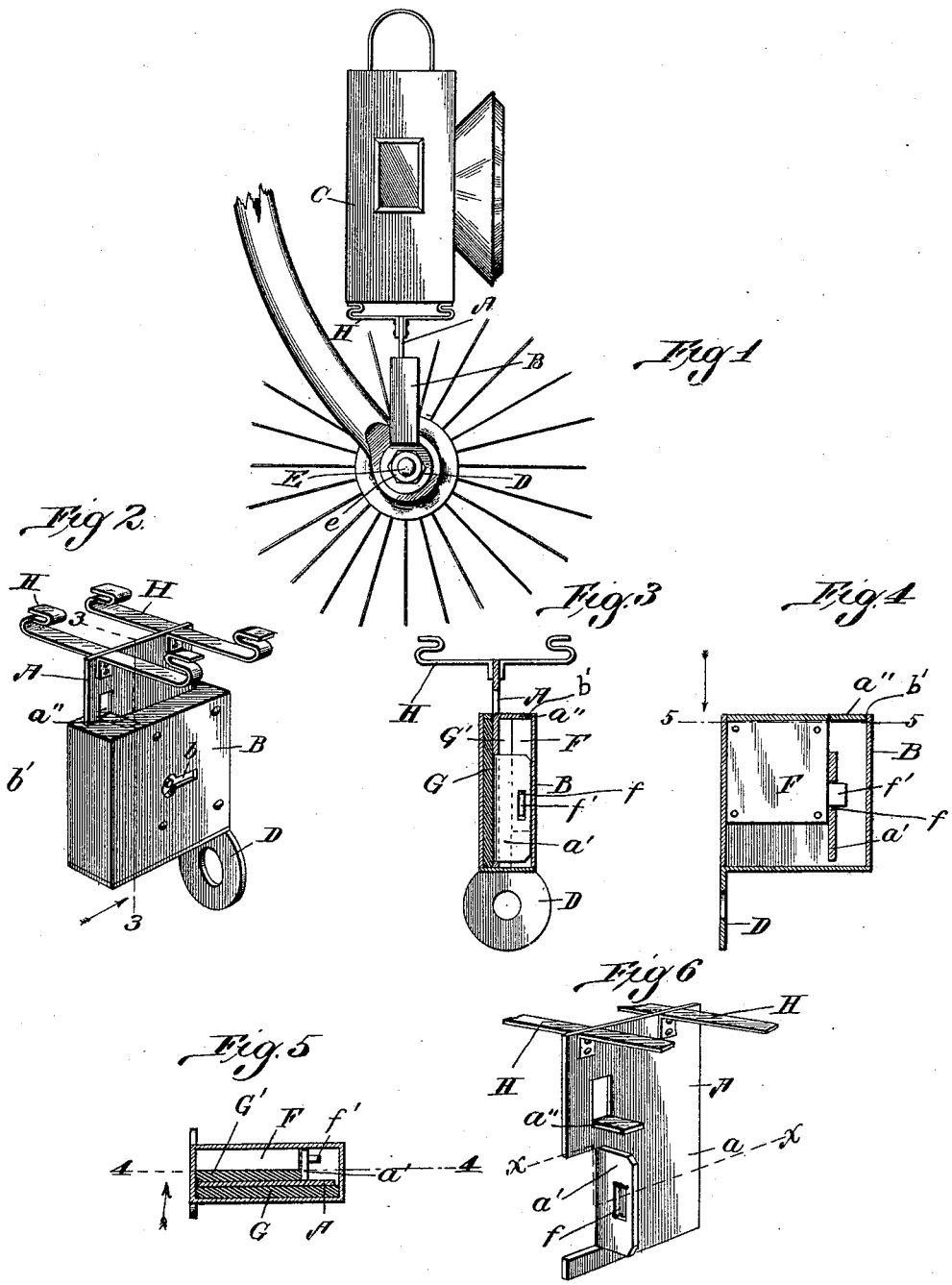
Witnesses:
John L. Tunison.
J. Cross.
James Atwill Jr.
Inventor.
By Gourley & Hopkins
His Attorneys

UNITED STATES PATENT OFFICE.

JAMES ATWILL, JR., OF CHICAGO, ILLINOIS.

LAMP-BRACKET.

SPECIFICATION forming part of Letters Patent No. 581,503, dated April 27, 1897.

Application filed September 14, 1896. Serial No. 605,761. (No model.)

*To all whom it may concern:*

Be it known that I, JAMES ATWILL, Jr., a citizen of the United States, residing at Chicago, in the county of Cook and State of Illinois, have invented certain new and useful Improvements in Lamp-Brackets, of which the following is a specification.

The present invention relates to a bracket that is intended more especially for securing lamps to bicycles and other vehicles; and its object is to provide a bracket of such construction that without the use of an appropriate key the removal of the lamp is made so difficult as to afford all the protection that is needed as against the loss of the lamp by theft. In accomplishing this object I construct the bracket of two members, one of which is in the nature of a hollow casing which provides a socket adapted to receive the other and the other of which is in the nature of a shank which is adapted to enter said socket, one of said members being provided with means for securely fastening it to the machine and the other of which has the lamp permanently secured to it, a lock being so associated with one member that when locked its bolt engages the other member and prevents their separation.

The invention consists in the features of novelty that are particularly pointed out in the claims hereinafter, and in order that it may be fully understood I will describe it with reference to the accompanying drawings, which are made a part of this specification, and in which—

Figure 1 is a side elevation of a portion of a bicycle or other vehicle, a lamp, and a bracket embodying the invention by which the lamp is attached to the machine. Fig. 2 is a perspective view of a bracket embodying the invention. Fig. 3 is a vertical section thereof substantially in the plane indicated by the line 3 3, Fig. 2. Fig. 4 is a vertical section thereof substantially in the plane indicated by the line 4 4, Fig. 5, looking in the direction of the arrow. Fig. 5 is a horizontal section thereof on the line 5 5, Fig. 4, looking downward. Fig. 6 is a perspective view of one of the two members of the bracket, hereinafter called the "shank."

The improved bracket has two members A and B, one of which is provided with means for attaching it to the machine and to the other of which the lamp C is permanently secured. In the drawings I have shown the lamp C as being secured to the member A, and I have shown the member B as being provided with means whereby it may be attached to the machine. The invention is not, however, limited in this respect, nor is the invention limited to any particular means for attaching the bracket to the machine. In the drawings I have shown it as being provided with an eye D, fitting upon the axle E of the front wheel and there secured by means of a nut e, but it will be understood that this is merely illustrative.

The member B is in the nature of a hollow casing, which is strongly built of sheet-steel or other suitable material and has in one of its sides a keyhole b for admitting a key to a lock F, which is permanently secured on the inside of the casing. In another side of the casing is an opening for admitting the other member or shank A, and aside from these two openings the case is closed. The shank consists of a body portion a, preferably made of plate-steel, a laterally-projecting tongue a', which lies in a vertical plane that is perpendicular to the plane of the body portion a, and a laterally-projecting tongue a'', which lies in a horizontal plane that is perpendicular to the plane of the body portion a, and the opening to the socket corresponds in outline to the cross-sectional shape of the shank in the planes indicated by the dotted line x x, Fig. 6, or, in other words, it is of L shape. The tongue a'' is so located that when the shank is in place in the socket of the member B said tongue closes the notch b' in the casing. Thus the one member is made to close the opening to the socket of the other member. When the shank is in place in its socket in the casing, its body portion a lies in a plane which is parallel with the general plane of the lock-case and its tongue a' projects across the plane of the lock-case and is provided with an opening f for receiving the bolt f' of the lock, sufficient clearance being left between the end of the lock-case and the end of the casing B for receiving the tongue a' and the lock-bolt when the latter is projected.

Within the casing are placed two pieces G G', of rubber or other suitable material, for the purpose of engaging the shank A and preventing noise. The piece G extends from end to end of the casing, but the piece G' is terminated opposite the notch b' in order not to interfere with the tongue a'.

I prefer to secure the shank A to the lamp C through the medium of springs H, of such shape and flexibility as will relieve the lamp of much of the vibration that would otherwise come upon it.

Having thus described my invention, the following is what I claim as new therein and desire to secure by Letters Patent:

1. In a lamp-bracket, the combination of two members, one of which consists of a shank of L shape in cross-section and the other of which consists of a casing having an opening corresponding with the cross-section of the shank, and a lock permanently secured within the casing and having a bolt adapted to engage the shank, substantially as set forth.

2. In a lamp-bracket, the combination of a shank, a hollow casing having an opening adapted to receive the shank, a lock permanently secured within the hollow casing and adapted to engage the shank, a packing disposed between the shank and the casing, and a packing disposed between the shank and the lock-case, the shank being of such shape that it completely closes the opening of the hollow casing and thereby prevents access to the parts within it, substantially as set forth.

3. In a lamp-bracket, the combination of a shank having a tongue proceeding laterally therefrom, a hollow casing having a socket adapted to receive said shank, the opening to the socket being of substantially the cross-sectional shape of the shank, and a lock secured within the casing and adapted to engage the tongue of the shank, substantially as set forth.

4. In a lamp-bracket, the combination of a shank having a laterally-projecting tongue, a hollow casing having a socket the opening to which is of substantially the cross-sectional shape of the shank, a lock secured within the casing and adapted to engage the tongue of the shank, and a second tongue proceeding from the shank and adapted to close the lateral branch of the opening to the socket, substantially as set forth.

JAMES ATWILL, Jr.

Witnesses:
   IDA CROSS,
   N. C. GRIDLEY.